United States Patent [19]

Timblin

[11] Patent Number: 5,252,838
[45] Date of Patent: Oct. 12, 1993

[54] OPTICAL DEVICE PROVIDES A CORRECT ALIGNMENT FOR PRINTING SCREEN WITH REFLECTIVE MARKERS AND ORIENTATION SENSORS

[75] Inventor: Stanley W. Timblin, Greensboro, N.C.

[73] Assignee: Innovative Automation, Inc., Greensboro, N.C.

[21] Appl. No.: 5,876

[22] Filed: Jan. 15, 1993

Related U.S. Application Data

[63] Continuation of Ser. No. 883,624, May 14, 1992, abandoned.

[51] Int. Cl.$^5$ .............................................. G01V 9/04
[52] U.S. Cl. .................................. 250/561; 101/181; 101/115
[58] Field of Search ................ 250/561, 548, 559, 557; 356/400, 401; 101/181, 115

[56] References Cited

U.S. PATENT DOCUMENTS

| | | | |
|---|---|---|---|
| 3,653,322 | 4/1972 | Richardson | 101/248 |
| 3,998,156 | 12/1976 | Zimmer | 101/115 |
| 4,114,534 | 9/1978 | Kudlich et al. | 101/115 |
| 4,361,260 | 11/1982 | Hanlan | 226/30 |
| 4,363,271 | 12/1982 | Horst | 101/181 |
| 4,484,522 | 11/1984 | Sinneth | 101/248 |
| 4,878,753 | 11/1989 | Nestmeier | 250/561 |

Primary Examiner—David C. Nelms
Assistant Examiner—Que T. Le
Attorney, Agent, or Firm—Rhodes, Coats and Bennett

[57] ABSTRACT

Apparatus assures correct alignment of a plurality of cylindrical, patterned textile printing screens arrayed horizontally, parallel with one another in a sequence of screens on heads which are rotated by a drive. Optical encoders associated with the drive mechanism for each screen indicate the orientations of the heads as they rotate, and reflective markers are located on the screens with an edge in a plane perpendicular to the axis of the screens and in a predetermined relationship to the pattern to be printed by the screen. An overhead laser source scans the screens aimed at a rotating mirror aligned to reflect light from the laser source to scan the reflective markers on the screens to a light sensor. A computer receives signals from the orientation sensors and the light sensor, and a counter counts at a rate on the order of 10 megahertz and recognizes a reflective marker when light is detected by the light detector for a threshold number of pulses. A memory stores values indicative of a desired relationship of the timing of pulses reflected from the reflective markers and the timing of the orientation scanners, and a comparison means which compensates for non-simultaneous scanning of the reflective markers generates an error signal indicative of misalignments of the screens from one another when the received signals indicate a relationship that varies by more than a threshold amount from the stored values. A readout displays error data to permit an adjustment of the heads to reduce the error.

34 Claims, 4 Drawing Sheets

| DYNAMIC ALIGNMENT | | | |
|---|---|---|---|
| READING POS 7 | D - INCHES<br>T - TURNS<br>C - CLICKS | D 0.000<br>T 0<br>C 0<br><br>3 | D +0.001<br>T -0<br>C -1<br><br>4 |
| D +0.003<br>T +0<br>C +1<br><br>5 | D -0.002<br>T -0<br>C -1<br><br>6 | D -0.017<br>T -0<br>C -4<br><br>7 | D +0.003<br>T +0<br>C +1<br><br>8 |
| D +0.005<br>T +0<br>C +2<br><br>9 | D -0.003<br>T -0<br>C -1<br><br>10 | D -0.001<br>T -0<br>C -0<br><br>11 | +CW<br>-CCW |

OPTICAL DEVICE PROVIDES A CORRECT ALIGNMENT FOR PRINTING SCREEN WITH REFLECTIVE MARKERS AND ORIENTATION SENSORS

This application is a continuation of application Ser. No. 07/883,624 filed May 14, 1992, now abandoned.

BACKGROUND OF THE INVENTION

The present invention relates to improvements in a rotary screen printing machine, particularly for textile printing to permit the proper alignment of the screens for registration of the colors to be printed with minimum expense and time.

It is now well-known in the textile industry to print patterns on fabrics using rotary screens. These are typically cylindrical screens having formed in them a plurality of holes corresponding with the locations in which a print paste color is to be extruded onto fabric. The screens are mounted in a sequence along a printing machine, over top of a belt on which the fabric travels at a rate of speed corresponding to the circumferential rotation speed of the screens. Thus, as the screens rotate and print paste is extruded through the holes of the screens, the fabric passing underneath on the blanket receives the print paste.

In order to print multi-colored patterns, the print paste extruded through the various screens must be applied to the fabric in a careful manner, so that the print paste applies to the portion of the fabric intended. That is, the patterns printed by the different screens must be "in registration", or "in fit" to prevent undesired overlapping of print paste or leaving uncolored gaps between print paste.

As can be appreciated, the printing machines are adapted to receive a multiplicity of different screens and print pastes so the different colorways, patterns and pattern repeats can be accommodated on a given machine. Each time one of these is to be changed, the screens from a previous patterns job are removed and replaced with screens for a new print job corresponding with the new pattern to be printed. In such a changeover, the exact mounting of the screens on the drive heads of the print machine can vary somewhat, particularly if a new style is being installed. The practice heretofore has been to use trial-and-error to advance and retard the various screens to cause them to come into fit, while a waste fabric known as a leader cloth is passed through and receives the print paste. Often, extensive amounts of such cloth must be wasted as well as loss of print paste and operator time involved in making the fine adjustments necessary to bring the different colors into registration. Despite long use of machines of this type and the long-felt desire to permit textile operators to avoid these costs in pattern changeovers, the need persists for an apparatus and method to minimize the expenses involved in such changeovers.

SUMMARY OF THE INVENTION

The present invention fulfills this need in the art by providing apparatus for assuring correct alignment of a plurality of cylindrical, patterned textile printing screens on heads rotated by a drive, including orientation sensors operatively associated with the heads to indicate the orientations of the heads as they rotate. Reflective markers are located on each of the screens in a predetermined relationship to the pattern to be printed by the screen, and an overhead light source is aligned to scan the reflective markers on the screens. A light sensor senses light reflected from the reflective markers as scanned from the overhead light source, and a computer receives signals from the orientation sensors and the light sensor. The computer is adapted to ascertain from the received signals misalignments of the screens from one another and to output an error signal indicative of such misalignment.

In a preferred embodiment the reflected light is evaluated at a rate on the order of 10 megahertz and the light source is a laser and scans the reflective markers by being reflected off a mirror that rotates on the order of 20 times per second. Preferably, the reflective markers are large enough to reflect on the order of 1000 pulses of light when they are scanned by the light source.

In a preferred embodiment a reference target is fixedly positioned to be scanned by the light source to provide a point of reference to assist the computer in making its misalignment computations.

Typically, the screen orientation sensors are optical encoders associated with the drive mechanism for each screen.

Desirably, the computer is adapted to recognize a reflective marker when at least a threshold level of reflected light is detected by the light detector. Also preferred is for the computer to include a memory storing values indicative of a desired relationship of the timing of light reflected from the reflective markers and the timing of the orientation scanners and adapted to generate the error signal when the received signals indicate a relationship that varies by more than a threshold amount from the stored values. Preferably, the computer is adapted to compensate for non-simultaneous scanning of the reflective markers in ascertaining misalignment.

In one embodiment, the computer has a readout and displays error data on the readout to permit an operator to adjust the heads to reduce the error. Alternatively, or in addition, motors may be interposed between the drive and the heads of the screens and the computer adapted to actuate one or more of the motors in response to the determination of a misalignment error to adjust the heads to reduce the error. Alternatively, clutches may be interposed between the drive and the heads of the screens and the computer adapted to actuate one or more of the clutches in response to the determination of a misalignment error to adjust the heads to reduce the error.

Usually, the plurality of screens are arrayed horizontally, parallel with one another to form a sequence of screens and it is preferred for the light source to be located overhead closer to the first screen of the sequence than to the last screen of the sequence.

In a particularly preferred embodiment, the reflective markers are located on the screens with an edge in a plane perpendicular to the axis of the screens and the light source is movable along a line parallel with the axes of the screens. Thus, the light source can be moved so that the light detector just detects an edge of the reflective marker of one screen and then the other screens can be moved axially to a point where the light detector just detects an edge of the reflective markers on them, too.

Also preferred is to provide additional reflective markers on the heads at a position known with respect to the position of the reflective markers on the screens.

The invention also provides a method of assuring correct alignment of a plurality of cylindrical, patterned textile printing screens on heads rotated by a drive. The method includes the steps of sensing the rotational orientation of the heads as they rotate, scanning an overhead light source past reflective markers located on the screens in a predetermined relationship to the pattern to be printed by the screens, and sensing light reflected from the reflective markers as scanned from the overhead light source. Then the method proceeds by computing from the sensed orientation and the sensed reflected light misalignments of the screens from one another, and outputting an error signal indicative of such misalignment. Preferably, the scanning step includes measuring a laser light reflected off a mirror rotating at a rate on the order of 20 times per second at a rate on the order of 10 megahertz. Desirably, the scanning step includes reflecting on the order of 1000 pulses of light off of the reflective markers when they are scanned by the light source and scanning a reference target fixedly positioned to provide a point of reference to assist in making the misalignment computations. Typically, the sensing step includes optically encoding the rotational orientation of the heads.

The computing step may include recognizing a reflective marker when at least a threshold level of reflected light from the light source is detected by the light detector, comparing stored values indicative of a desired relationship of the timing of pulses reflected from the reflective markers and the timing of the orientation scanners with sensed values and generating the error signal when the sensed values vary by more than a threshold amount from the stored values. In doing so it is desirable to compensate for non-simultaneous scanning of the reflective markers.

The computing step may include displaying error data on a readout to permit an operator to adjust the heads to reduce the error. And, one or more motors interposed between the drive and the heads of the screens may be actuated in response to the determination of a misalignment error to adjust the heads to reduce the error. Alternatively, one or more clutches interposed between the drive and the heads of the screens may be actuated in response to the determination of a misalignment error to adjust the heads to reduce the error.

Usually, the plurality of screens are arrayed horizontally, parallel with one another to form a sequence of screens. In such a case the scanning step preferably includes scanning the last screen of the sequence at an angle more acute than the first screen of the sequence.

Also preferred is locating the reflective markers on the screens with an edge in a plane perpendicular to the axis of the screens, moving the light source along a line parallel with the axes of the screens, so that the light detector just detects an edge of the reflective marker of one screen, and moving the other screens axially to a point where the light detector just detects an edge of the reflective markers on them, too.

The method also includes as an option attaching additional, more permanent reflective markers on the heads at a position known with respect to the position of the reflective markers on the screens and scanning the additional reflective markers instead of temporary reflective markers located on the screens.

BRIEF DESCRIPTION OF THE DRAWINGS

The invention will be better understood after a reading of the Detailed Description of the Preferred Embodiments and a review of the drawings in which:

FIG. 5 is a view of a video screen display suitable for use in an embodiment of the present invention.

DETAILED DESCRIPTION OF THE PREFERRED EMBODIMENTS

Figure 1:
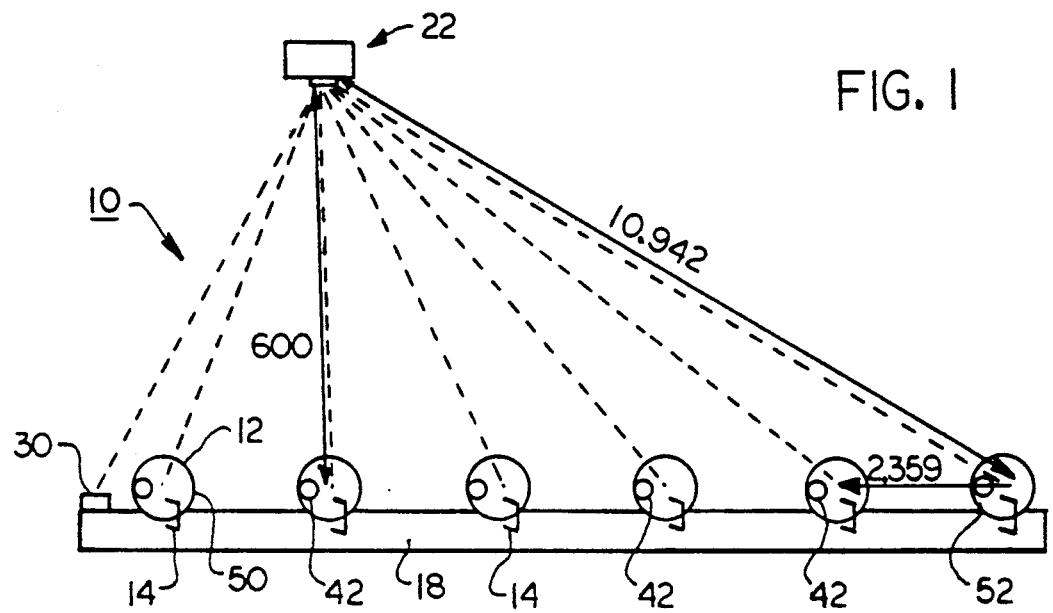
FIG. 1 is a schematic side view of a printing machine equipped with apparatus according to an embodiment of the present invention.
Figure 2:
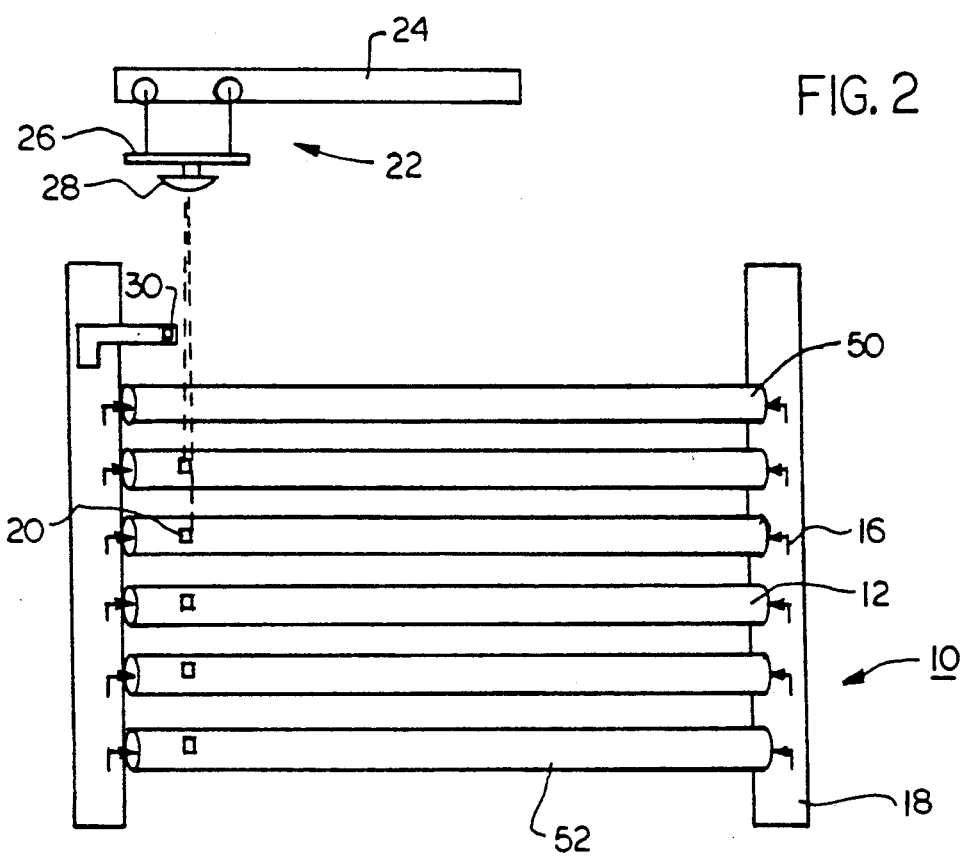
FIG. 2 is a schematic perspective view of a printing machine equipped with apparatus according to an embodiment of the present invention.

FIGS. 1 and 2 show side and elevation schematic renderings of the apparatus of the present invention as installed on a conventional rotary screen printing machine 10. The rotary screen printing machines can be any suitable conventional machine, such as those sold by Mitter GmbH & Co., Zimmer Machinery Corp. or Stork Brabant B. V. The machines typically have a plurality of perforated screens 12 mounted for rotation on a frame 18. The frame 18 also includes a drive mechanism (not shown) to continuously rotate the screens 12 in synchronization with one another, and in synchronization with a belt moving under the screens, also not shown. The screens are mounted in heads 16, shown schematically in FIG. 2, and adapted for axial adjustment to permit the precise placement of the screens along their axial length, an important element in obtaining proper registration of the screens.

Also provided are optical encoders 14, which generate electrical signals indicative of the angular orientation of the head at a given time. However, information about the angular orientation of the head is not determinative of the angular orientation of the screen 12.

Accordingly, in setting up a new style using machines of this type in the past, it has been necessary to first visually install the screens in a "guesstimate" position, run leader cloth through the machine and print on the leader cloth to see where the prints appear. Then, the screens are adjusted both axially and azimuthally with respect to the head 16 to achieve registration. In this process, a considerable amount of leader cloth, print paste and time is necessarily consumed.

The present invention adds certain elements to the above-described conventional apparatus to facilitate the quick setup of screens in a desired configuration and permit rapid style changes.

In the invention, each of the screens 12 is provided with a reflective marker 20 of a precise size and shape, precisely located on the screens. More permanent markers are located on the heads or end rings of the screens. The reflective markers 20 are selected to be very highly retro-reflective to nearly normally incident light. They are located on the screens in proximity to the pitch marks which appear on conventional screens. Also provided is a scanning light source 22. The source 22 includes a transverse rail 24 mounted on the ceiling over the screens 12. A carriage 26 is movable transversely of the machine direction along the rail 24 and has mounted on it a scanning laser apparatus 28. The scanning laser includes a fixed laser source and a rotating mirror oriented so that, as the mirror rotates, the laser beam scans across the multiplicity of markers 20, including a fixed reference marker 30 on the machine base 18. The mirror angle is signaled to computer CPU 40 from a sensor 29. The scanning light source 28 also includes a light detector to detect reflected light coming back from the markers 20, 30.

Figure 3:
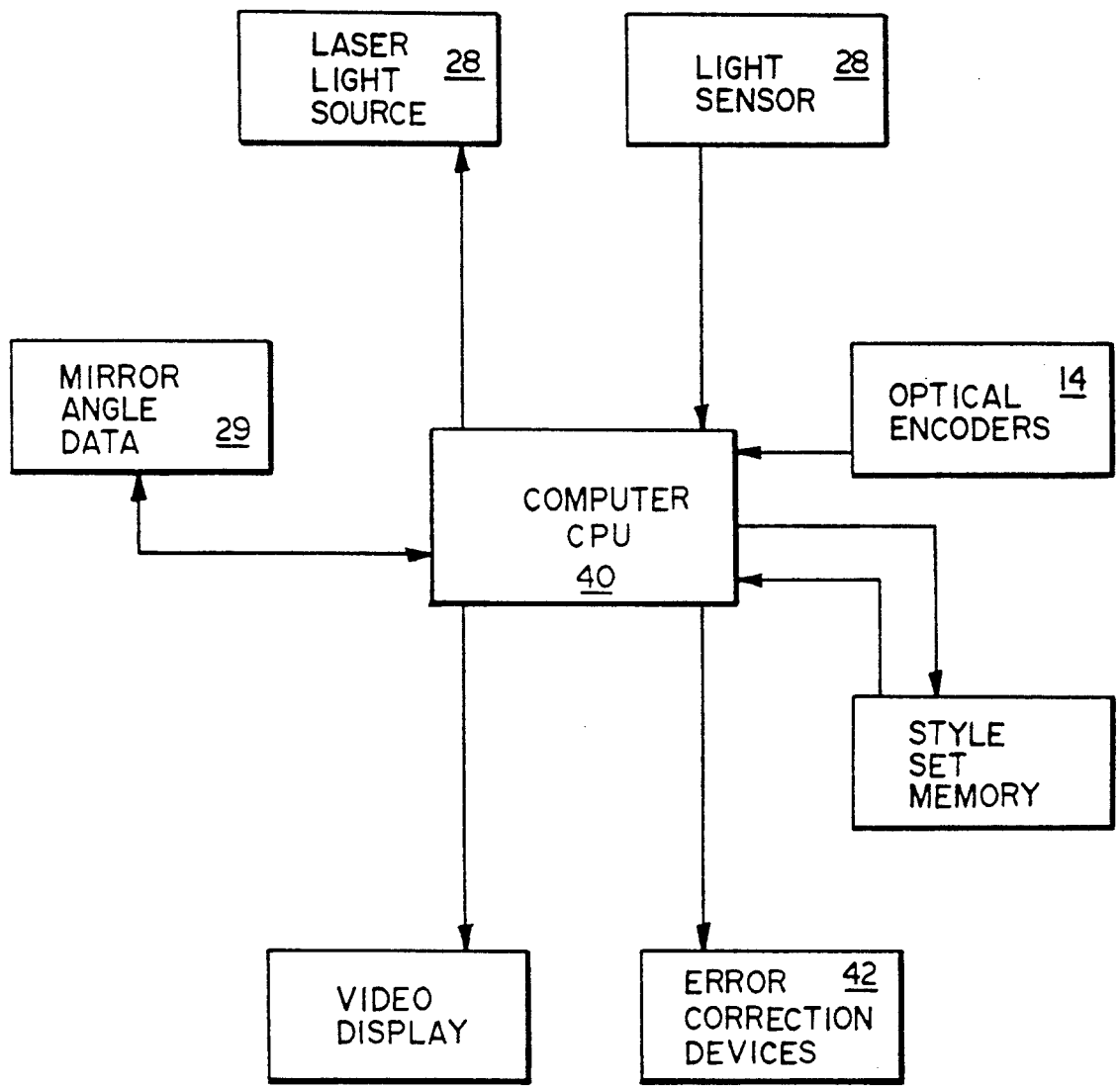
FIG. 3 is a block diagram of the functional units of an embodiment of the present invention.

The laser is operated under the influence of computer 40 (see FIG. 3). A suitable computer 40 is an IBM-compatible personal computer having a 386 or 486 series chip operating at 25 to 50 megahertz. A 10 megahertz clock is used to time the measurements of reflected light reflected. The mirror is selected to rotate on the order of 20 revolutions per second, so that the laser light scans the reflective markers 20 twenty times a second. Thus, each scan includes about 500,000 timer counts. The light is picked up by the light sensor 28 and applied to the computer CPU 40 including timer boards, where they are counted. Desirably, the markers 20 are made of a size so that approximately 1000 laser pulses are reflected each time the light scans one marker 20.

The computer includes a conventional video display 46 and a memory holding style data 44. The computer has an output to error correction devices 42, which may take the form of clutches or stepper motors interposed between the drive of the mechanism 18 and the heads. Actuation of the error correction devices 42 will change the head angle to lead or lag the drive angle, as desired, to reduce the error detected by the computer 40.

Figure 4:
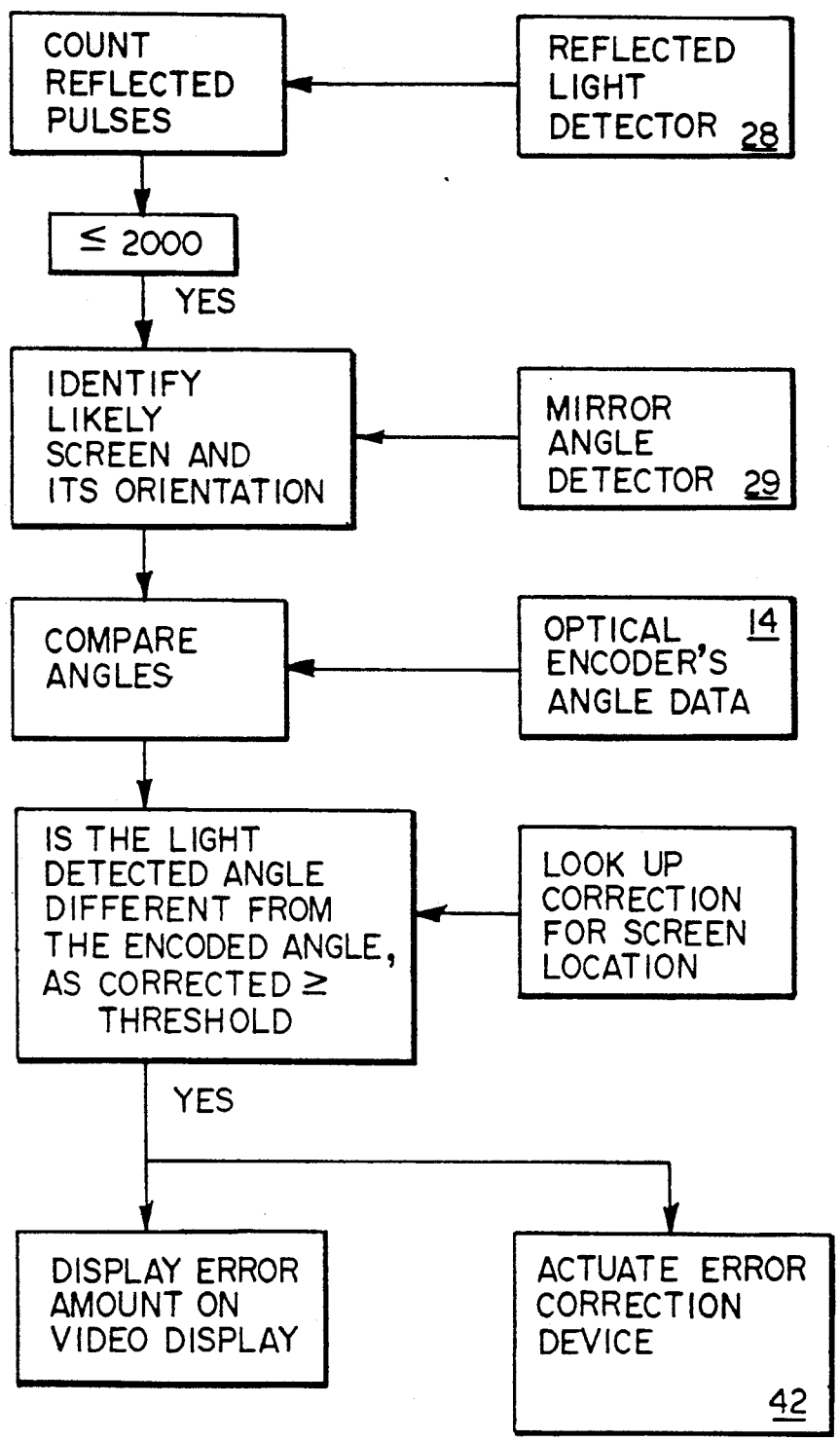
FIG. 4 is a flow chart of processing according to an embodiment of the method of the present invention.

Operation of the apparatus is controlled by the computer 40 under a sequence indicated in FIG. 4. Light sensed by the sensor 28 is applied to the computer 40 which counts the number of clock pulses during detection of the reflected light. Only when a threshold number—1000 in a preferred embodiment—of pulses in sequence are counted is it determined that, in fact, a full marker 20 or 30 has been scanned. This prevents stray light and inadvertent reflections from causing the apparatus to give false interpretations to the received data. The position of the mirror is ascertained from the mirror angle detector 29, to identify the screen giving rise to the detected light. Alternately, the position of the mirror is ascertained from the mirror angle 10 megahertz pulse counter 29, to identify the screen giving rise to the detected light. The position in its rotation of each marker 20 is then determined by reference to the delay from the detection of the fixed marker 30. This data is then compared with the data on the head angle generated by the optical encoder 14. In the event that the light detected position differs from the optically encoded angle by greater than a threshold amount, a determination can be made that an error exists in registration.

The object is to resolve angle differences to zero, so that all angles as detected by the light detector are on target when the corresponding screen optical encoders are at their target position. As part of this process, a look-up correction factor must be included. This look-up correction factor is determined as a result of the laser needing to "see" the target in a narrow range of angles rather than the exact nominal angle for each screen. That is, as can be seen in FIG. 1, for a first screen 50, the distance (angle) at which retro-reflection of the marker occurs is considerably different than the distance (angle) for screen 52, and this difference is taken into account in determining adjustments for "seeing" targets over a range of angles. The look-up correction could be applied to the angle measurement and comparison steps elsewhere than as specifically depicted in FIG. 4.

The optical encoder is used on the mechanical screen drive to tell the computer where the drive has rotated the screens. When the laser sees the target on the first screen at a nominal laser angle, the computer functionally resets the screen drive encoder counters for the other screens to zero. That is, all of the screens in the printing process must be aligned to the first screen. With the optical encoder reset to zero by the detection of the target on the first screen, the computer then compares the optical encoder count when the laser "sees" the screen targets at their nominal laser angle positions with the objective target optical encoder numbers. For example, if the "target" count is 6,000 for screen number 3, when it is at its nominal laser angle, and if the encoder actually is at 6,010 when the screen is "seen" by the laser at its nominal position, then it is determined that screen number 3 is 10 counts ahead of target. If one count equals 0.001 inch, the screen would need to be retarded by 0.010 inch. On a manual version of the system, the operator would be instructed to retard the screen by 0.010 inch. In the case of the automated version, the positioning motor would make the correction.

The laser needs to be allowed to see the target in a narrow window, rather than only at a nominal position. With the laser scanning and the screens turning, the laser may not be aimed at the screen when the screens' target in its nominal position with respect to the laser. To make the window system operable, a table of compensating numbers must be put into the computer. If on screen number 3, the surface of the screen moves 0.01 inch for each optical encoder count, and if the laser scan across the screen moves 0.0005 for each laser count, then for each two laser counts that the laser "sees" the target early in its angle window, the screen drive encoder count position objective target number would have to be adjusted by one count.

Referring again to FIG. 2, in the initial setup of the styles, the carriage 26 can be moved laterally so that the scanning laser just touches the edge of the reflective marker 20 of one of the screens 12. Then, the axial position of the other screens 12 can be adjusted using the adjustable heads 16 to achieve the same edge position as for the first screen. This will assure that the various screens are axially placed in registration with one another. Then, the carriage 26 can be moved back to center on the markers 20 for operation as described above to rotationally adjust the positions of the screens with respect to their respective heads 16. This can be done either automatically through the installation of stepper motor or clutches or other error corrections devices 42, or manually, using manual adjustments typically provided by the machinery manufacturers.

When a style is to be run for the first time, the desired relationship between the angular orientation of the markers 20 and the optically encoded angle will not be known. Accordingly, when first setting up a style, it is advisable to run leader cloth and adjust the screens in conventional fashion for azimuthal fit. Then, the angular offset of the reflected angle and the optically encoded angle will be known and can be stored in style set memory 44. The next time the particular pattern is to be run, the style set memory 44 can be accessed for that pattern and the desired orientation between the laser detected angle and the optically encoded detected angle will be known and can be re-achieved without the need of running leader cloth. It is also desirable to locate a second reflective marker on the end ring of each screen, so that, in the event that the marker on the screen itself is abraded through contact with the fabric over a period of time, the precise location is still known, since end rings of print screens are mountable in one fashion only.

FIG. 5 shows a typical video display screen illustrating the deviation of each print screen from its desired position to signal desired changes to an operator. In the figure, D shows the deviation in inches, T shows the number of turns the fit control knob should be turned to correct the position on the machines equipped with such knobs, and C shows the number of clicks (18 clicks per turn) which are needed to fine-tune the correction.

A particularly important advantage in the present invention is the location of the scanning laser overhead, so that it is completely out of the way of operators changing screens and the like. The scanning of the screens can continue throughout the printing operation to correct for any deviations which may occur in the operation of the printing apparatus. If the number of rolls to be scanned is excessive, duplicate scanning sources 22 can be provided.

Those of ordinary skill in the art will appreciate the various modifications to the invention as described herein may be made. These are all deemed to be within the scope of the present invention.

What is claimed is:

1. An apparatus for assuring correct alignment of a plurality of cylindrical, patterned textile printing screens on heads rotated by a drive comprising
    orientation sensors operatively associated with said heads to indicate the orientations of said heads as they rotate,
    reflective markers located on each of said screens in a predetermined relationship to the pattern to be printed by the screen,
    an overhead light source aligned to scan said reflective markers on the screens,
    a light sensor to sense light reflected from said reflective markers as scanned from said overhead light source, and
    a computer receiving signals from said orientation sensors and said light sensor and adapted to ascertain from said received signals misalignments of the screens from one another and to output an error signal indicative of such misalignment.

2. An apparatus as claimed in claim 1 in which said computer includes a counter to count the duration of received light at a rate on the order of 10 megahertz.

3. An apparatus as claimed in claim 2 wherein said light source is a laser.

4. An apparatus as claimed in claim 2 wherein said light source is a laser and scans said reflective markers by being reflected off a rotating mirror.

5. An apparatus as claimed in claim 4 wherein said mirror rotates on the order of 20 times per second.

6. An apparatus as claimed in claim 5 wherein said reflective markers are large enough to reflect on the order of 1000 pulses of light when they are scanned by the light source.

7. An apparatus as claimed in claim 1 wherein a reference target is fixedly positioned to be scanned by said light source to provide a point of reference to assist said computer in making its misalignment computations.

8. An apparatus as claimed in claim 1 wherein said orientation sensors are optical encoders associated with the drive mechanism for each screen.

9. An apparatus as claimed in claim 1 wherein said computer is adapted to recognize a reflective marker when at least a threshold number of pulses are counted during detection of light source by said light detector.

10. An apparatus as claimed in claim 1 wherein said computer includes a memory storing values indicative of a desired relationship of the timing of pulses reflected from the reflective markers and the timing of the orientation scanners and is adapted to generate the error signal when the received signals indicate a relationship that varies by more than a threshold amount from the stored values.

11. An apparatus as claimed in claim 1 wherein said computer is adapted to compensate for non-simultaneous scanning of the reflective markers in ascertaining misalignment.

12. An apparatus as claimed in claim 1 wherein said computer has a readout and displays error data on said readout to permit an operator to adjust the heads to reduce the error.

13. An apparatus as claimed in claim 1 further comprising motors interposed between the drive and the heads of the screens and wherein said computer is adapted to actuate one or more of the motors in response to the determination of a misalignment error to adjust the heads to reduce the error.

14. An apparatus as claimed in claim 1 further comprising clutches interposed between the drive and the heads of the screens and wherein said computer is adapted to actuate one or more of the clutches in response to the determination of a misalignment error to adjust the heads to reduce the error.

15. An apparatus as claimed in claim 1 wherein the plurality of screens are arrayed horizontally, parallel with one another to form a sequence of screens and said light source is located overhead closer to the first screen of the sequence than to the last screen of the sequence.

16. An apparatus as claimed in claim 1 wherein the reflective markers are located on the screens with an edge in a plane perpendicular to the axis of the screens and said light source is movable along a line parallel with the axes of the screens, so that the light source can be moved so that the light detector just detects an edge of the reflective marker of one screen and then the other screens can be moved axially to a point where the light detector just detects an edge of the reflective markers on them, too.

17. An apparatus as claimed in claim 1 further comprising additional reflective markers on the heads at a position known with respect to the position of the reflective markers on the screens.

18. An apparatus for assuring correct alignment of a plurality of cylindrical, patterned textile printing screens arrayed horizontally, parallel with one another to form a sequence of screens on heads which are rotated by a drive comprising
    optical encoders associated with the drive mechanism for each screen to indicate the orientations of said heads as they rotate,
    reflective markers located on the screens with an edge in a plane perpendicular to the axis of the screens and in a predetermined relationship to the pattern to be printed by the screen,
    an overhead laser source, a rotating mirror aligned to reflect light from the laser source to scan said reflective markers on the screens and located overhead closer to a first screen of said sequence than to a last screen of said sequence and movable along a line parallel with the axes of the screens, a light sensor to sense light reflected from said reflective markers as scanned from said overhead light source, and a computer having input terminals to receive signals from said orientation sensors and said light sensor, a counter which counts pulses during reception of signals from said light sensor that it is sensing light, said computer being adapted to recognize a reflective marker when at least a threshold number of pulses are counted during reception of signals that said light sensor is sensing light, a memory storing values indicative of a desired relationship of the timing of pulses reflected from the reflective markers and the timing of the orientation scanners, a comparison means adapted to compensate for non-simultaneous scanning of the reflective markers and to generate an error signal indicative of misalignments of the screens from one another when the received signals indicate a relationship that varies by more than a threshold amount from the stored values, and a readout that displays error data to permit an adjustment of the heads to reduce the error.

19. A method of assuring correct alignment of a plurality of cylindrical, patterned textile printing screens on heads rotated by a drive comprising sensing the rotational orientation of the heads as they rotate, scanning an overhead light source past reflective markers located with reference to the screens in a predetermined relationship to the pattern to be printed by the screens, sensing light reflected from the reflective markers as scanned from the overhead light source, computing from the sensed orientation and the sensed reflected light misalignments of the screens from one another, and outputting an error signal indicative of such misalignment.

20. A method as claimed in claim 19 in which said computing step includes pulsing a counter on and off at a rate on the order of 10 megahertz during sensing of light reflected from the reflective markers.

21. A method as claimed in claim 19 in which said scanning step includes reflecting the light from the overhead light source off a rotating mirror toward the reflective markers and pulsing a counter on and off at a rate on the order of 10 megahertz during sensing of light reflected from the reflective markers.

22. A method as claimed in claim 21 wherein the mirror rotates on the order of 20 times per second.

23. A method as claimed in claim 22 in which said pulsing step includes counting on the order of 1000 pulses during sensing of light reflected off of the reflective markers when they are scanned by the light source.

24. A method as claimed in claim 19 in which said scanning step includes scanning a reference target fixedly positioned to provide a point of reference to assist in making the misalignment computations.

25. A method as claimed in claim 19 wherein the orientation sensing step includes optically encoding the rotational orientation of the heads.

26. A method as claimed in claim 19 wherein said computing step includes recognizing a reflective marker when at least a threshold level of light reflected from the light source is detected by the light detector.

27. A method as claimed in claim 19 said computing step includes comparing stored values indicative of a desired relationship of the timing of pulses reflected from the reflective markers and the timing of the orientation scanners with sensed values and generating the error signal when the sensed values vary by more than a threshold amount from the stored values.

28. A method as claimed in claim 19 wherein said computing step includes compensating for non-simultaneous scanning of the reflective markers while ascertaining misalignment.

29. A method as claimed in claim 19 wherein said computing step includes displaying error data on a readout to permit an operator to adjust the heads to reduce the error.

30. A method as claimed in claim 19 wherein said computing step includes actuating one or more motors interposed between the drive and the heads of the screens in response to the determination of a misalignment error to adjust the heads to reduce the error.

31. A method as claimed in claim 19 wherein said computing step includes actuating one or more clutches interposed between the drive and the heads of the screens in response to the determination of a misalignment error to adjust the heads to reduce the error.

32. A method as claimed in claim 19 wherein the plurality of screens are arrayed horizontally, parallel with one another to form a sequence of screens and said scanning step includes scanning the last screen of the sequence at an angle more acute than the first screen of the sequence.

33. A method as claimed in claim 19 further comprising locating the reflective markers on the screens with an edge in a plane perpendicular to the axis of the screens, moving the light source along a line parallel with the axes of the screens, so that the light detector just detects an edge of the reflective marker of one screen, and moving the other screens axially to a point where the light detector just detects an edge of the reflective markers on them, too.

34. A method as claimed in claim 19 further comprising attaching additional reflective markers on the heads at a position known with respect to the position of the reflective markers on the screens and scanning the additional reflective markers instead of the reflective markers located on the screens.

* * * * *